United States Patent [19]

Antier et al.

[11] 4,058,696

[45] Nov. 15, 1977

[54] INDUCTION HEATING APPARATUS COMPRISING A STATIC CONVERTER

[75] Inventors: Georges Antier; Alain Thiodet, both of Paris, France

[73] Assignee: Tocco-Stel, Paris, France

[21] Appl. No.: 640,562

[22] Filed: Dec. 15, 1975

[30] Foreign Application Priority Data

June 17, 1975 France .................................. 75.18963

[51] Int. Cl.² ............................................. H05B 5/04
[52] U.S. Cl. .......................... 219/10.77; 219/10.49 R; 307/252 M; 363/57
[58] Field of Search ............... 219/10.49, 10.75, 10.77; 321/45 C, 45 R, 45 ER, 45 S; 307/252 M, 252 R, 252 A

[56] References Cited

U.S. PATENT DOCUMENTS

| | | | |
|---|---|---|---|
| 2,517,425 | 8/1950 | Grumel | 219/10.75 X |
| 2,662,162 | 12/1953 | Blok | 219/10.75 X |
| 3,273,046 | 9/1966 | Bedford | 307/252 M |
| 3,379,955 | 4/1968 | Koetsch | 321/45 |
| 3,652,874 | 3/1972 | Partridge | 307/252 M |
| 3,710,002 | 1/1973 | Peters | 219/10.49 |
| 3,781,503 | 12/1973 | Haanden et al. | 219/10.49 |
| 3,832,573 | 8/1974 | Planck et al. | 307/252 M |

FOREIGN PATENT DOCUMENTS

| | | |
|---|---|---|
| 1,365,784 | 8/1962 | France |
| 982,254 | 2/1965 | United Kingdom |

OTHER PUBLICATIONS

McMurray, "Optimum Snubbers for Power Semiconductors," IEEE Trans. Industry Applications, Sept./Oct. 1972, vol. 1A-8, No. 5, pp. 593-630.

J. M. Peter, "Protection of Diodes & Thyristors Against Overvoltages," Toute l'Electroniques, No. 399, 5/75, pp. 47-55.

M. M. Peter, "A New Thyristor Allows the Construction of a 40 KHz Inverter," Sescosem, No. 3, 4/76, pp. 10-17.

*Primary Examiner*—Bruce A. Reynolds
*Attorney, Agent, or Firm*—Cushman, Darby & Cushman

[57] ABSTRACT

An induction heating apparatus comprising a static converter including a bidirectional controlled switch having a main thyristor and a diode connected in parallel to conduct in opposite directions. The converter comprises a first circuit for protection against the spurious turning on of the thyristor caused by overshoot voltages due to the sudden interruption of the current flowing through the charging inductor when the switch is turned off. This protection circuit comprises, connected in series across the charging inductor, a diode and a capacitor which is charged through the diode when the voltage across the inductor terminals becomes positive, and discharged through a current-limiting resistor and an auxiliary thyristor into the gate of the main thyristor for triggering it periodically. A novel second circuit for protection against excessive rates of rise of the voltage across the thyristor is also provided, including a resistor and a capacitor in series, connected in parallel with the inductance of the resonant commutating circuit.

2 Claims, 6 Drawing Figures

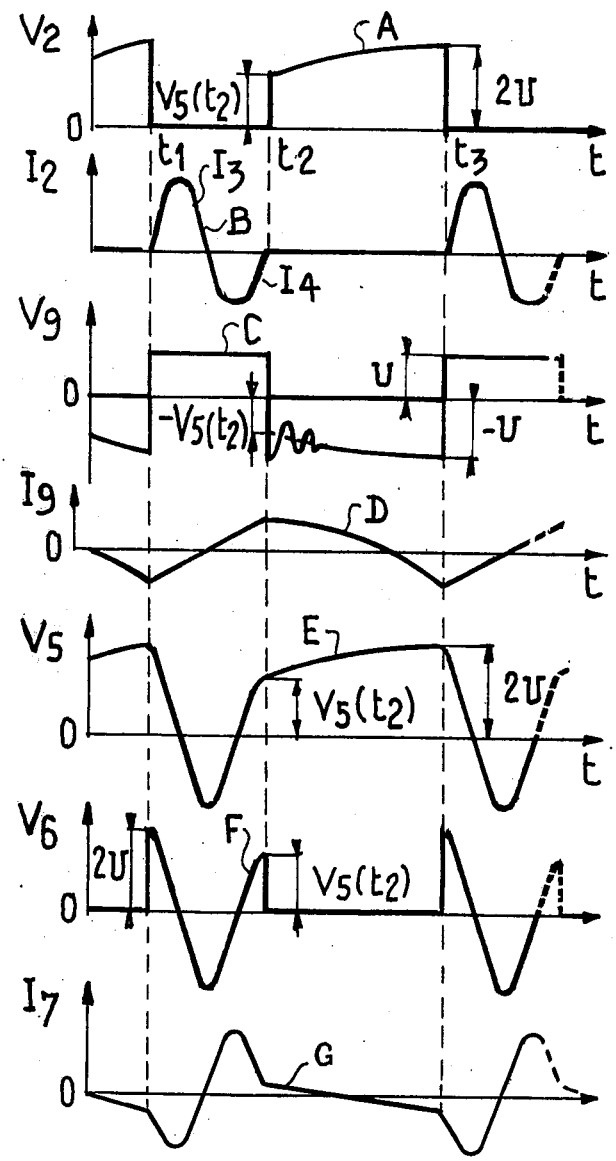

INDUCTION HEATING APPARATUS COMPRISING A STATIC CONVERTER

The present invention relates to an induction heating apparatus comprising as its source of energy a static converter including a thyristor or silicon controlled rectifier for converting direct current electric power obtained by rectifying alternating current power from the mains, into alternating current electric power of a relatively high frequency (some tens of Khz).

Converters of this kind, for example in induction heating equipment, generally operate at frequencies in the ultrasonic range (between 20 and 40 Khz for example), this range also referred to as industrial high frequencies. The static converters of induction heating apparatus supplying high frequency power to a load or heating inductor, are generally supplied with a.c. power from the mains, this power being rectified by a diode bridge and filtered in order to supply d.c. power to the converter proper.

The converter generally comprises a resonant circuit which generates high frequency power at a frequency corresponding to the resonant frequency of this circuit, together with a bidirectional controlled switching circuit including a thyristor and a diode in parallel, connected to conduct in opposite directions. The triggering of the thyristor by the application of a suitable pulse to its gate, renders the switch conductive, and consequently, generates an oscillatory current flowing through the resonant circuit so that one cycle of high-frequency power is delivered, the thyristor conducting during the first half-cycle and the diode conducting during the second half cycle of the oscillatory current.

Substantial problems arise as soon as it is required to supply high powers from a converter of small volume, that is to say an easily transportable converter intended for multiple applications.

As a thyristor or silicon controlled rectifier is not turned off immediately after the current flowing through it has reached zero value at the end of the first half-cycle of oscillation of the resonant circuit, but only after an interval of time, called turn-off time or T.O.T., has elapsed. This means that a high voltage can be reapplied between the anode and the cathode of the thyristor without spuriously turning it on, only with a delay greater than the turn-off time after it has ceased to conduct. It is therefore necessary that the time during which the diode of the bidirectional switch circuit conducts, is greater than the turn-off time of the thyristor. At the time interval during which the diode conducts is the second half-cycle of the oscillatory current, this second half-cycle should, therefore, be greater than the thyristor turn-off time. Thus, it is not possible to increase the high-frequency power delivered by the converter by increasing the resonant frequency of the tuned circuit unlimitedly, nor for that matter the repetition frequency of the recurrent thyristor triggering signal.

It is therefore necessary to increase the energy stored in the capacitor of the oscillatory circuit ($\frac{1}{2} CV^2$) without excessively increasing the capacitance C of the capacitor since the latter parameter determines, together with the inductance L, the frequency of oscillation. In a converter of this type, the capacitor of the resonant circuit is charged during the periods for which the bidirectional switch does not conduct, through a charging inductor, to a voltage slightly less than the double of the peak value of the mains voltage (around 600 V.), which supplies across the terminals of the resonant circuit, when the switch is turned on, an alternating voltage having a peak-to-peak value of twice that level (around 1200 V.).

The increase in the voltage makes it possible, on the one hand, to increase the high frequency power supplied by the converter and, on the other hand, to utilize a cable of not insubstantial length in order to transmit the power to the load, which may be at a remote location, this increasing the versatility of the heating applications which this kind of apparatus can be used for. This increase in the supply voltage, however, introduces a number of drawbacks, one of which is the overshoot across the charging inductor connecting the direct voltage source to one of the junctions of the resonant circuit with the bidirectional switch. This overshoot occurs when the switch is turned off suddenly at the end of a resonance period. Another drawback is the reduction in the thyristor turn-on voltage by an increase in the rate of rise of the anode-cathode voltage (dv/dt), which is known as the "rate effect."

The present invention makes it possible to overcome these drawbacks and, within a reduced volume, to increase the power delivered by the converter, which may be portable, to the load circuits, in comparison with known induction heating apparatus of this kind.

It is an object of the invention to provide an induction heating apparatus including static converter (inverter) having switching means comprising a thyristor (silicon controlled rectifier) and improved circuits for protecting this thyristor from spurious turning on due to excess overshoot voltages and/or to excessive rate of rise of its anode-to-cathode voltage.

It is another object of the invention to provide a static inverter wherein the voltage blocking requirements of the thyristor and reduced for a given output power or wherein, for a given blocking voltage, the output power can be increased as the voltage rise rate is being reduced by means of the novel protection circuit.

It is a further object of the invention to provide a novel overshoot protection circuit where the overshoot voltage is rectified and stored in a capacitor, and where the energy thus obtained is used for triggering the thyristor of the switching means.

The invention will be better understood and other features and advantages will become apparent, from the following description, given by way of example, and the accompanying drawings in which:

FIG. 1 schematically illustrates a prior art type static converter including a thyristor which can be used in an induction heating apparatus in accordance with the invention;

FIG. 2 illustrates waveforms of the voltages and the currents at various points in the circuit of FIG. 1;

Figure 1:
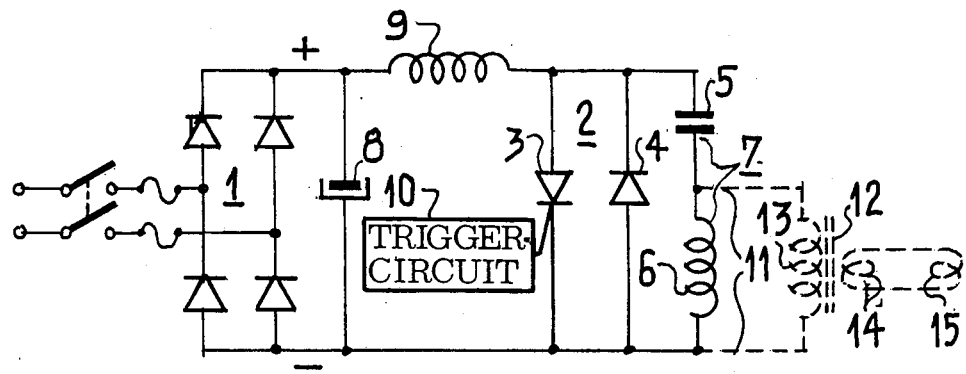

In FIG. 1, the reference 1 signifies a diode rectifier bridge (a Graetz bridge) connected to the mains and supplying a d.c. voltage U through a charging inductor 9, to a so-called commutating circuit 7 constituted by a capacitor 5 and an inductor 6 in series, with a bidirectional controlled switch 2 connected in parallel across the arrangement 7 and comprising a thyristor 3 and a diode 4 arranged in parallel and connected to conduct in opposite directions.

The anode of the thyristor 3 and the cathode of the diode 4 are connected to the positive terminal of the rectifier bridge 1 through a charging inductor 9, and the cathode of the thyristor 3 and the anode of the diode 4 are directly connected to the negative terminal of the bridge 1, the two terminals being connected together by means of a filtering capacitor 8.

The gate of thyristor 3 is controlled by means of a control circuit 10, of a kind known per se, generating periodic triggering (control) pulses.

The commutating circuit 7 forms, when the bidirectional switch 2 including the parallel arrangement of thyristor 3 and diode 4 is turned on, a parallel resonant circuit delivering a full oscillatory cycle of sinusoidal alternating current, which is more or less damped depending on the load to be heated by induction and coupled to the inductor 6. The periodicity T of this oscillation is approximately equal to $2\pi\sqrt{L_6 C_5}$ and must be greater than twice the turn-off time (TOT) of the thyristor 3.

When the circuit of FIG. 1 is first switched on by connecting the rectifier bridge 1 to the terminals of the a.c. mains, the rectifier bridge 1 supplies a positive voltage which charges the filtering capacitor 8 up to a voltage U close to the peak value of the mains voltage. This voltage U is applied to the terminals of the circuit including the charging inductor 9, the capacitor 5 and the inductor 6 in series (the bidirectional switch 2 being turned off), forming a series resonant circuit, which charges the capacitor 5 to a maximum positive voltage of around 2U in approximately half a cycle of oscillation of the circuit $L_9$, $C_5$ ($L_6$ being small and $C_8$ being large in relation to these values). If the repetition frequency of the pulses triggering the thyristor 3, is such that the thyristor 3 becomes conductive every time the voltage across the terminals of the capacitor 5 reaches its peak (around 2U), then the converter will supply to the load a maximum peak power. By reducing the triggering frequency from this value, both the peak power and the mean power are reduced since the voltage across the terminals of the capacitor 5 decreases after having reached its peak value.

In FIG. 2, the waveforms of voltage and current at various points in the circuit of FIG. 1 have been shown for the normal operating conditions (the starting transients have not been shown).

The voltage $V_2$ across the terminals of the bidirectional switch 2 (thyristor 3 and diode 4) has been illustrated by the diagram A, the thyristor 3 having been triggered at the instant $t_1$ at which the capacitor 5 is charged to around 2U. During one resonance period of the parallel oscillatory circuit $L_6$, $C_5$, the switch 2 conducts the current $I_2$ flowing through this circuit and shown in diagram B. The first, positive half-cycle of this current $I_3$ passes through the thyristor 3, and the second $I_4$, which is negative, passes through the diode 4 and allows the turning off of the thyristor 3.

The negative half cycle $I_4$ ends the instant $t_2$, when the diode 4 ceases to conduct, and at this instant the voltage across the terminals of the thyristor almost instantaneously rises to a positive value $V_5(t_2)$ equal to that across the terminals of the capacitor 5, as shown by the diagram E in FIG. 2. This shows a voltage rise rate ($dv/dt$) which may become excessive and bring about spurious turning on of the thyristor 3 at the instant $t_2$, thus impairing the correct operation and also reducing the service life of the components. It is therefore necessary to limit the voltage rise rate by means of a protection circuit which will be described further on.

At the same instant $t_2$, the voltage $V_9$ across the terminals of the charging inductor 9 changes instantaneously from $+U$ to $-V_5(t_2)$ and, if the value of $V_5(t_2)$ is high that is to say, close to U, the inductor 5 being lightly loaded or not loaded at all, overshoot voltages (positive ones at the anode of the thyristor 3) will occur across the terminals of the charging inductor 9 following the sudden cut-off of the current flowing through the bidirectional switch 2, and the peaks of these overshoot oscillations may exceed the turn-on voltage of the thyristor 3 even in the absence of any triggering signal at its gate. These overshoot phenomena occurring after the instant $t_2$, as well as the voltage $V_9$, have been shown in diagram C of FIG. 2.

The diagrams D, E, F and G of FIG. 2 respectively illustrate the waveforms of the current $I_9$ in the charging inductor 9, of the voltage $V_5$ across the terminals of the capacitor 5, of the voltage $V_6$ across the terminals of the inductor 6 and of the current $I_7$ flowing through the series arrangement 7 of capacitor 5 and inductor 6.

Figure 3:
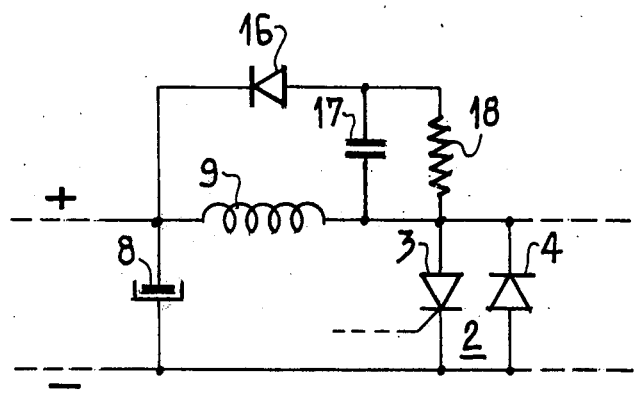
FIG. 3 is a schematic diagram of a converter comprising a prior art type protection circuit against overshoot voltages across the charging inductor.

FIG. 3 illustrates a prior art type overshoot protection circuit designed to protect the thyristor 3 against overshoot voltages across the charging inductor 9.

The overshoot protection circuit comprises a diode 16 in series with an arrangement including a capacitor 17 and a resistor 18 connected in parallel with one another.

In FIG. 3, the diode 16 has its cathode connected to the junction between the charging inductor 9 and the positive terminals of the bridge 1 and the capacitor 8, while the parallel RC arrangement 17, 18 is connected to the junction between the charging inductor 9 and the commutating circuit 7 and the bidirectional controlled switch 2.

When, at the instant $t_2$, the voltage $V_9$ (graph C of FIG. 2) becomes suddenly negative, the diode 16 starts to conduct and charges the capacitor 17 of this first protection circuit, and acts as virtual short circuit for the overshoot voltage or oscillations, through the capacitor 17. Between the instant $t_2$ and instant $t_3$, the capacitor 17 charges up to the voltage $-U$ and the diode 16 virtually ceases to conduct.

When at the instant $t_3$, the voltage $V_9$ across the terminals of the charging inductor 9 changes suddenly from $-U$ to $+U$, the diode 16 becomes blocked and the capacitor 17 discharges across the resistor 18 in parallel with it, while the bidirectional switch 2 is conductive.

The respective values $R_{18}$ and $C_{17}$ of the resistor 18 and the capacitor 17, are chosen so that a complete discharge of the capacitor 17 across the resistor 18 takes place within a time interval shorter than a cycle of oscillation of the parallel resonant circuit 5, 6 closed by the switch 2 (that is to say the time constant $R_{18} \cdot C_{17}$ must be less than one third of the resonant period T). The voltage across the terminals of the capacitor 17 varies between 0 and $-U$ and cannot, therefore, be used in the circuit.

Figure 4:
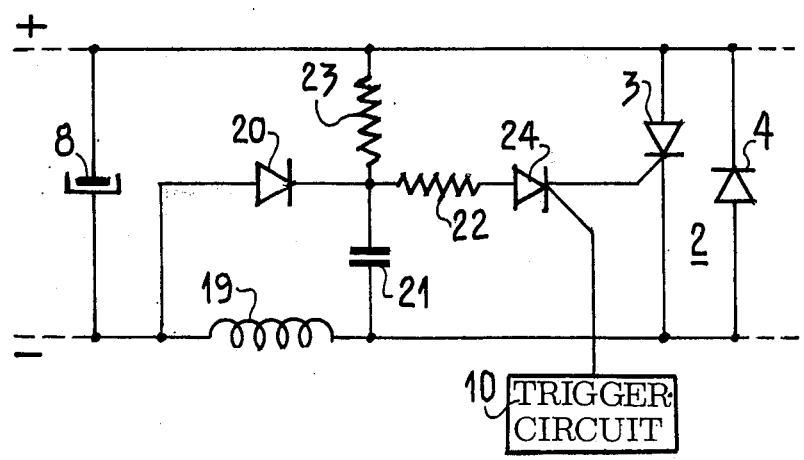
FIG. 4 is a schematic diagram of an embodiment according to the invention of the overshoot protection circuit shown in FIG. 3.

FIG. 4 shows an embodiment of the overshoot protection circuit, according to the invention described above. In the inverter circuit of FIG. 4, the components have been re-arranged relatively to that of FIG. 3, so as to make it possible to utilize the energy stored in the capacitor of this protection circuit during each charging cycle, of the commutating capacitor 5 in order to trigger the thyristor 3.

To reverse the polarity of the voltage waveforms at the terminals of the charging inductor 19, the latter has been connected between the negative terminal of the rectifier bridge 1 and the cathode of the thyristor 3.

The protection diode 20 has its anode connected to the same negative terminal and its cathode to one of the terminals of the protection capacitor 21 whose other terminal is connected to the junction between the charging inductor 19 and the cathode of the thyristor 3.

The junction between the cathode of the diode 20 and the capacitor 21, is connected through a current-limiting resistor 22 in series with an auxiliary thyristor 24, to the gate of the main thyristor 3 of the bidirectional switch 2.

The gate of the auxiliary or trigger thyristor 24 is connected to the output of the triggering pulse generator or control circuit 10 which is of a conventional type and which delivers recurrent positive pulses of sufficient amplitude to turn the auxiliary thyristor 24 on, the gating current of the auxiliary thyristor 24 being less than one tenth of that of main thyristor 3. Each time the auxiliary thyristor 24 receives a triggering pulse, it connects the protection capacitor 21, which is positively charged, to the gate of the main thyristor 3, to discharge it therethrough.

To allow the starting of the circuit prior to the first triggering of the main thyristor 3, there having been yet no reversal of polarity of the voltage (negative) at the terminals of the charging inductor 19, it is necessary to connect the common point between the cathode of the diode 20, the capacitor 21 and the current-limiting resistor 22, to the positive terminal of the rectifier bridge 1 through a high value resistor 23 so that an initial positive charging of the capacitor 21 can be obtained.

It should be noted that in order to trigger the main thyristor 3, current pulses of a substantial amplitude with a steep rise flank, are required. The choice of the value of the current limiting resistor 22 in series with the auxiliary thyristor 24, makes it possible to adjust the amplitude and duration of the triggering pulses for the main thyristor 3 to a desired value.

Figure 5:
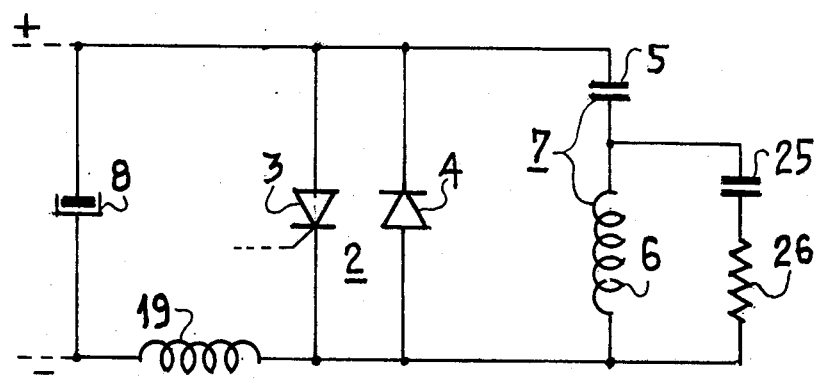
FIG. 5 is a diagramm of another improved protection circuit according to the invention for reducing the rate of rise of the voltage across the thyristor terminals.

FIG. 5 schematically illustrates an embodiment of another type of protection circuit according to the invention for protecting the thyristor 3 against spurious turning on due to excessive voltage rise rates (dv/dt) across its terminals.

In the prior art, in order to limit these rates of voltage rise, series arrangements of a resistor and a capacitor connected in parallel with the switch 2, were used. This implies the use of a capacitor of high capacitance and a resistor of relatively low resistance in order to absorb the sudden variations in voltage (i.e., to integrate them), and gives rise to substantial energy losses in the resistor.

The rise rate protection circuit in accordance with the present invention provides the thyristor with better protection against excessive rise rates, while the energy losses are substantially less than those encountered in the prior art arrangements.

This rise rate protection circuit comprises a series arrangement of a resistor 26 and a capacitor 25 connected in parallel across the inductor 6 of the switching circuit 7, which makes it possible to ensure that the entire voltage $V_5(t_2)$ across the terminals of the capacitor 5 at instant $t_2$, is not immediately applied across the terminals of the thyristor 3.

Figure 6:
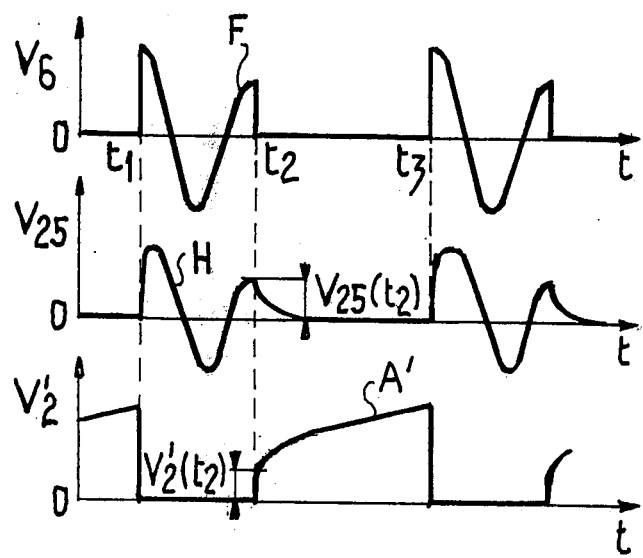
FIG. 6 illustrates the waveforms of the voltages across the terminals of the rise rate protection circuit and across those of the thyristor, in FIG. 5.

In FIG. 6, the waveforms of the voltages at various points in the circuit of FIG. 5 have been shown in order to explain the operation of the rise rate protection circuit.

The voltage $V_6$ across the terminals of the inductor 6 is transmitted, with a certain phase-shift, across the resistor 26 to the capacitor 25 which, at the instant $t_2$ when the diode has ceased to conduct, is still charged to a voltage $V_{25}(t_2)$ slightly less than $V_5(t_2)$. This voltage $V_{25}(t_2)$ (diagram H) across the terminals of the capacitor 25, is subsequently aperiodically discharged through the resistor 26 and the inductor 6 (damped by the resistor 26). However at the instant $t_2$ when the switch 2 is cut-off, the voltage $V_{25}(t_2)$ is applied, in series with $V_5(t_2)$ across the terminals of the capacitor 5, with a polarity opposite to that of $V_5(t_2)$, across the bidirectional switch 2 (that is to say across the thyristor 3), which, consequently, at the instant $t_2$, will carry across its terminals a voltage $V'_2(t_2) = V_5(t_2) - V_{25}(t_2)$, which is obviously less than $V_5(t_2)$ and which gradually rises in accordance with the choice of the time constant $R_{26} \cdot C_{25}$.

As mentioned earlier, it is necessary to choose the values of $R_{26}$ and $C_{25}$ in order to ensure aperiodic discharge of the capacitor 25, that is to say that $R_{26}$ must be greater than $\sqrt{4L_6/C_{25}}$.

A static converter in accordance with the invention as well as a heating apparatus incorporating it, can be used wherever a power of around 4 kilowatts and a frequency of 25 to 35 kilohertz is required, for example heating metal components introduced into the magnetic field of the inductor 15.

What is claimed is:

1. In an induction heating apparatus having an induction heating coil for heating metallic objects coupled thereto, a static converter fed by a d.c. voltage from a rectifier circuit and including:

a resonant commutating circuit having a commutating capacitor and a commutating inductor connected in series, said commutating inductor being inductively coupled to said induction heating coil;

a bidirectional controlled switch having a gate controlled first thyristor and a diode connected in parallel to conduct in opposite directions and connected in parallel to said commutating circuit;

a charging inductor connecting the negative terminal of the rectifier circuit to the junction between said commutating circuit, the cathode of said first thyristor and the anode of said diode, the positive terminal of said rectifier circuit being connected to the junction between said commutating circuit, the anode of said first thyristor and the cathode of said diode, for providing said commutating capacitor with resonant charging to a voltage biasing said first thyristor positively and said diode negatively;

a triggering circuit for recurrently gating said first thyristor to make said bidirectional switch conducting for a full cycle of resonant current through said commutating circuit, the first thyristor conducting during the first half-cycle and the diode during the second half-cycle of said resonant current, whereafter said bidirectional switch ceases to conduct; and an overshoot protection circuit for providing protection against spurious turning on of said thyristor due to overshoot voltages produced across said charging inductor when said bi-directional switch suddenly ceases to conduct, including a protection diode and a protection capacitor arranged in series and respectively connected by their free terminals to the terminals of said charging inductor, the anode of the protection diode being connected to the junction between the charging inductor and the negative rectifier output terminal, so that it conducts in a direction opposite the current flow through the charging inductor when the bidirectional switch is conducting, wherein, to utilize the energy stored in the protection capacitor, when said first thyristor is being turned on, said triggering circuit comprising:

an auxiliary thyristor connected in series with a first, current-limiting resistor between the junction of the cathode of said protection diode and said protection capacitor and the gate of said first thyristor, said auxiliary thyristor having a gate fed by recurrent gating pulses for discharging said protection capacitor through itself and the gate-to-cathode junction of said first thyristor; and a second, starting resistor connected between the positive rectifier output terminal and the junction of said protection capacitor with the cathode of said protection diode and said current limiting resistor for positively charging said protection capacitor when said converter is being switched on.

2. In an induction heating apparatus having an induction heating coil for heating metallic objects coupled thereto, a static converter fed by a d.c. voltage from a rectifier circuit and including:

a resonant commutating circuit having a commutating capacitors and a commutating inductor connected in series, said commutating inductor being inductively coupled to said induction heating coil, a bidirectional controlled switch having a gate controlled thyristor and a diode connected in parallel to conduct in opposite directions and connected in parallel to said commutating circuit;

a charging inductor connecting one of the terminals of said rectifier circuit to one of the junctions between the commutating circuit and the bidirectional switch, the other rectifier terminal being connected to the other junction thereof; and a rise-rate protection circuit including a series arrangement of a protection capacitor and a protection resistor, wherein the improvement comprises means for connecting said protection capacitor-resistor series arrangement in parallel to said commutating inductor for forming an at least critically damped parallel resonant circuit therewith, whereby, the voltage across said protection capacitor, which follows with a phase lag the one across said commutating inductor while the bidirectional switch conducts, is applied to said thyristor in series with, and with an opposite polarity to the voltage across said commutating capacitor, when said bidirectional switch ceases to conduct, whereafter said commutating capacitor discharges aperiodically across said protection resistor and said commutating inductor in series.

* * * * *